(12) United States Patent
Kusnitz

(10) Patent No.: US 9,227,735 B2
(45) Date of Patent: Jan. 5, 2016

(54) AERIAL REFUELING SYSTEM AND METHOD

(71) Applicant: The Boeing Company, Chicago, IL (US)

(72) Inventor: Joshua M. Kusnitz, Seattle, WA (US)

(73) Assignee: The Boeing Company, Chicago, IL (US)

( * ) Notice: Subject to any disclaimer, the term of this patent is extended or adjusted under 35 U.S.C. 154(b) by 405 days.

(21) Appl. No.: 13/860,533

(22) Filed: Apr. 11, 2013

(65) Prior Publication Data

US 2014/0306063 A1    Oct. 16, 2014

(51) Int. Cl.
  *B64D 39/00*    (2006.01)
  *B64D 39/04*    (2006.01)
  *B64D 39/06*    (2006.01)

(52) U.S. Cl.
  CPC ............... *B64D 39/00* (2013.01); *B64D 39/04* (2013.01); *B64D 39/06* (2013.01)

(58) Field of Classification Search
  CPC ........ B64D 39/00; B64D 39/02; B64D 39/04; B64D 39/06
  See application file for complete search history.

(56) References Cited

U.S. PATENT DOCUMENTS

| 8,074,931 B2 | 12/2011 | Schroeder |
| 8,118,261 B1 | 2/2012 | Schroeder |
| 2003/0136874 A1 | 7/2003 | Gjerdrum |
| 2006/0038076 A1* | 2/2006 | Schroeder ................ 244/135 A |
| 2006/0208132 A1* | 9/2006 | Jones ............................ 244/10 |

FOREIGN PATENT DOCUMENTS

| GB | 2405384 A | 3/2005 |
| WO | WO2006091779 A1 | 8/2006 |
| WO | WO2013102906 A2 | 7/2013 |

OTHER PUBLICATIONS

International Search Report for PCT/US2014/031615 dated Dec. 3, 2014.
Wikipedia, "Aerial Refueling" retrieved Jan. 23, 2013.
Aerial Refueling Archive, "Sargent Fletcher ART/S Pod—F-16," retrieved Jan. 23, 2013.

* cited by examiner

*Primary Examiner* — Philip J Bonzell
*Assistant Examiner* — Nicholas McFall

(57) ABSTRACT

A refueling system may include a refueling hose and a refueling drone coupled to the hose aft end. The refueling drone may be rearwardly deployable from the tanker aircraft such that the refueling drone is towed by the refueling hose behind the tanker aircraft. The refueling drone may be engaged to a receiver aircraft for transferring fuel from the tanker aircraft to the receiver aircraft.

20 Claims, 11 Drawing Sheets

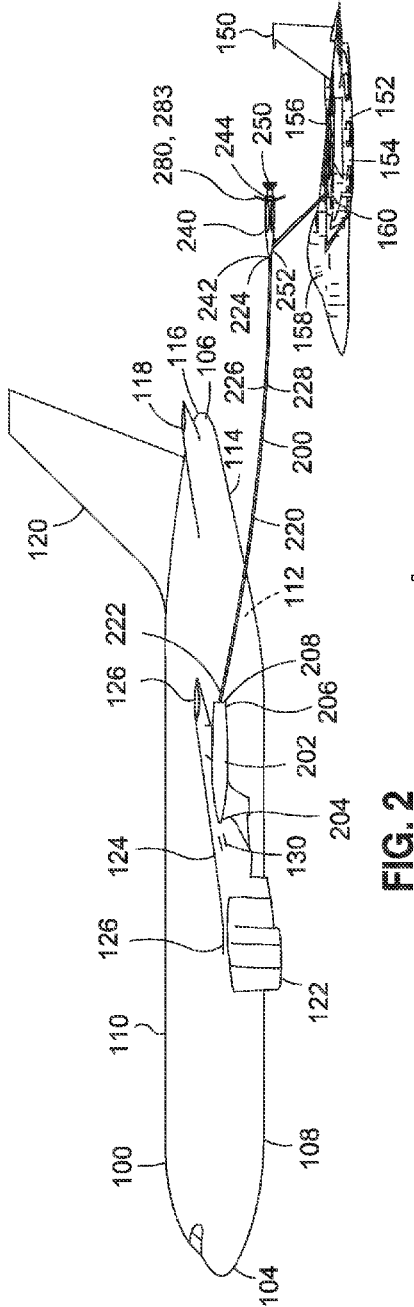
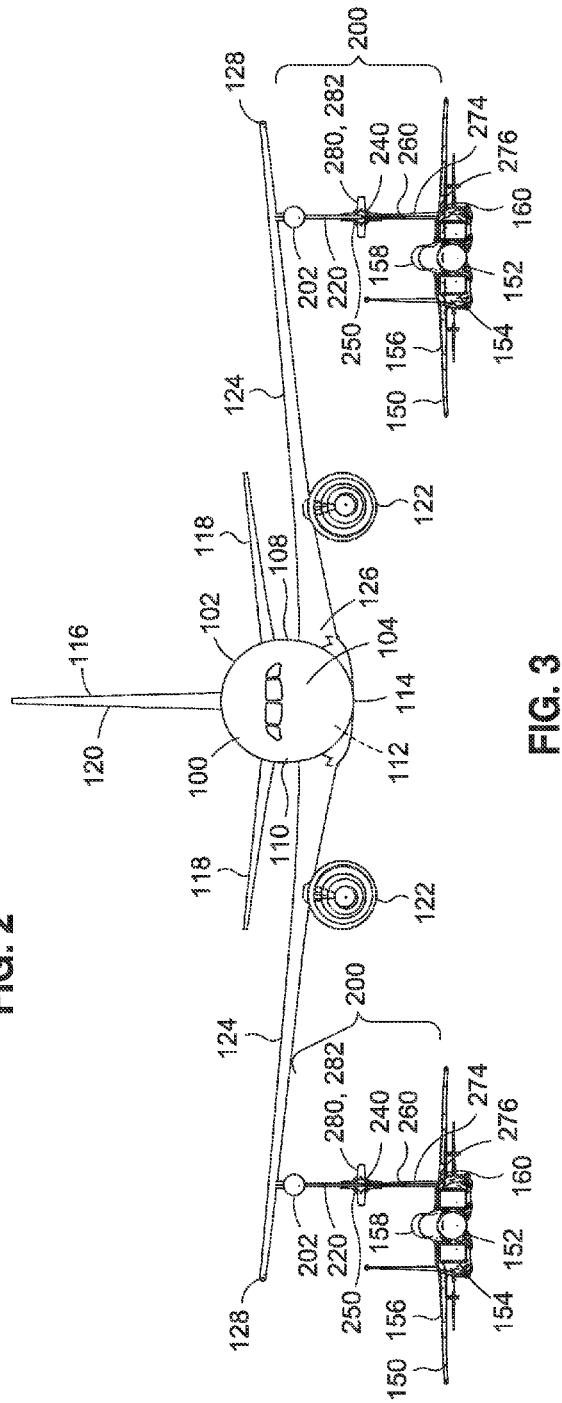
FIG. 2
FIG. 3

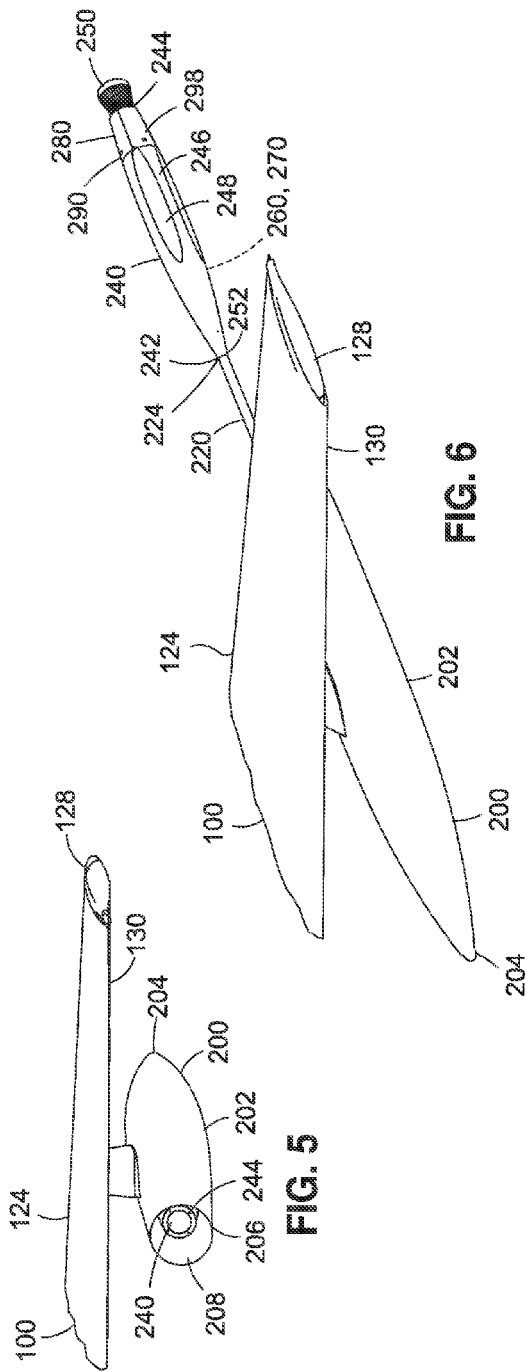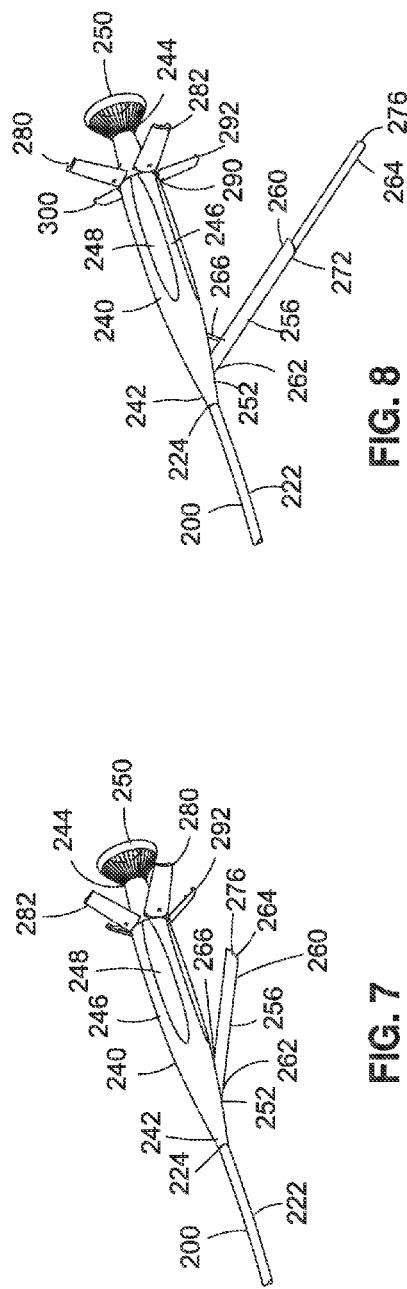

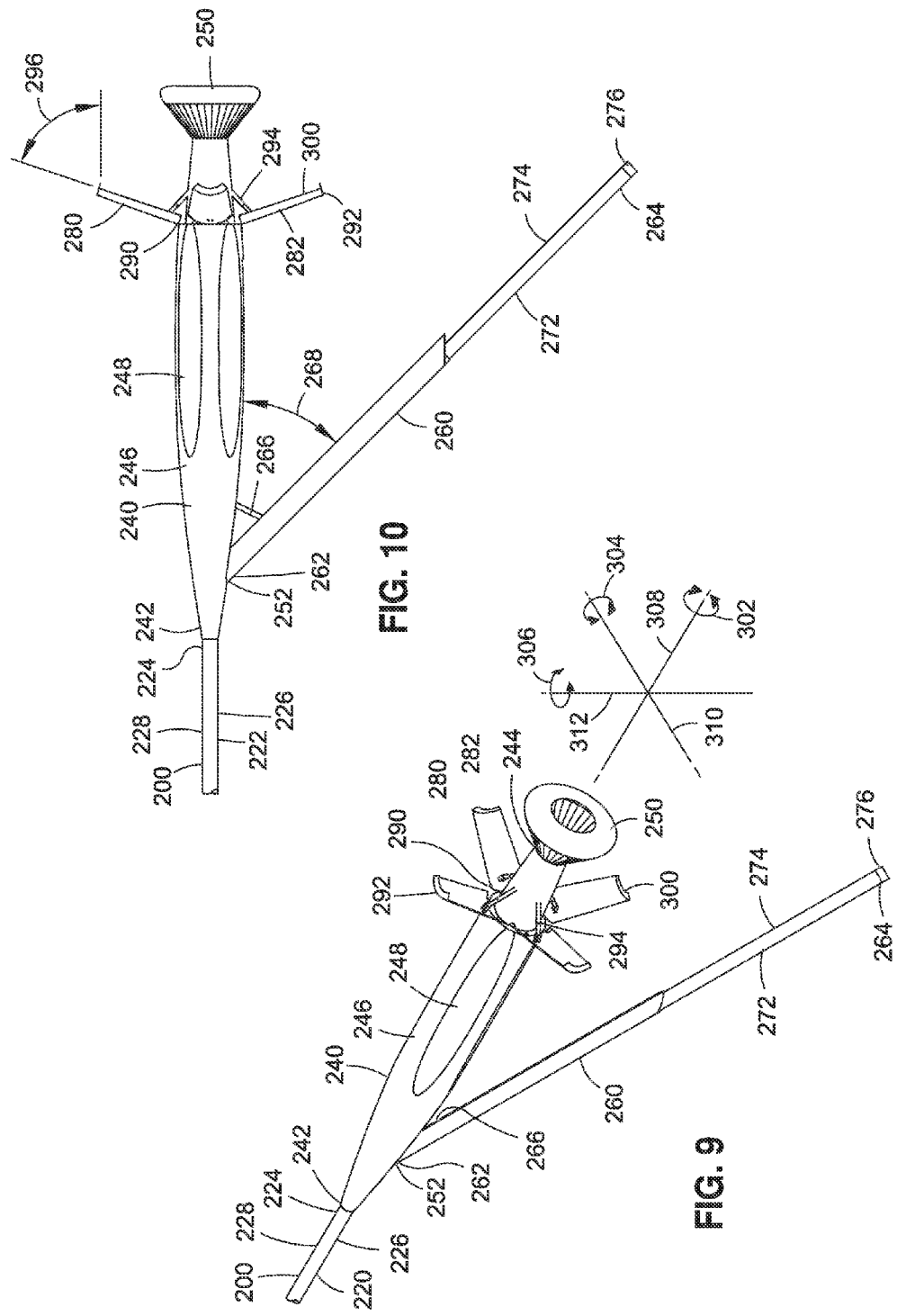

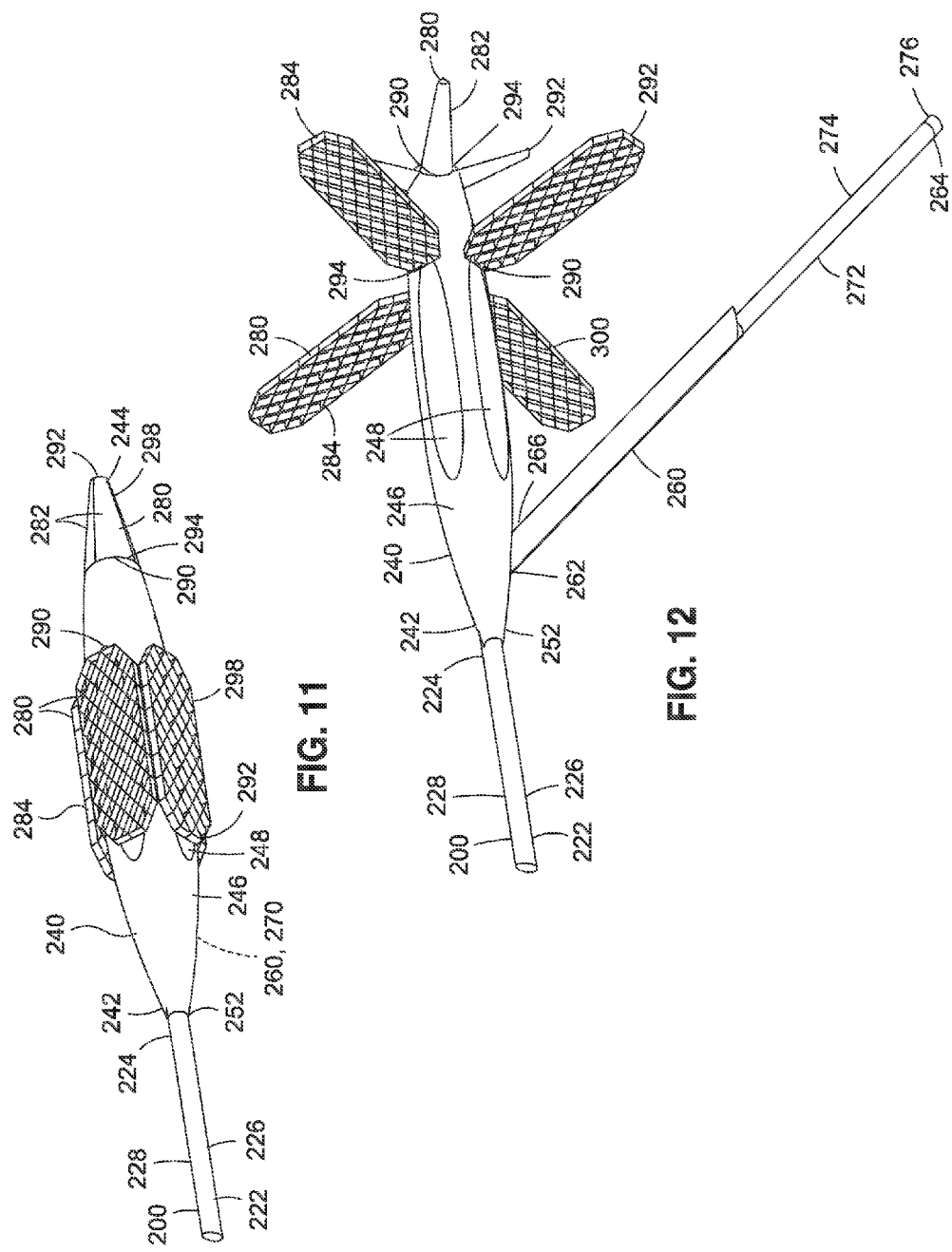

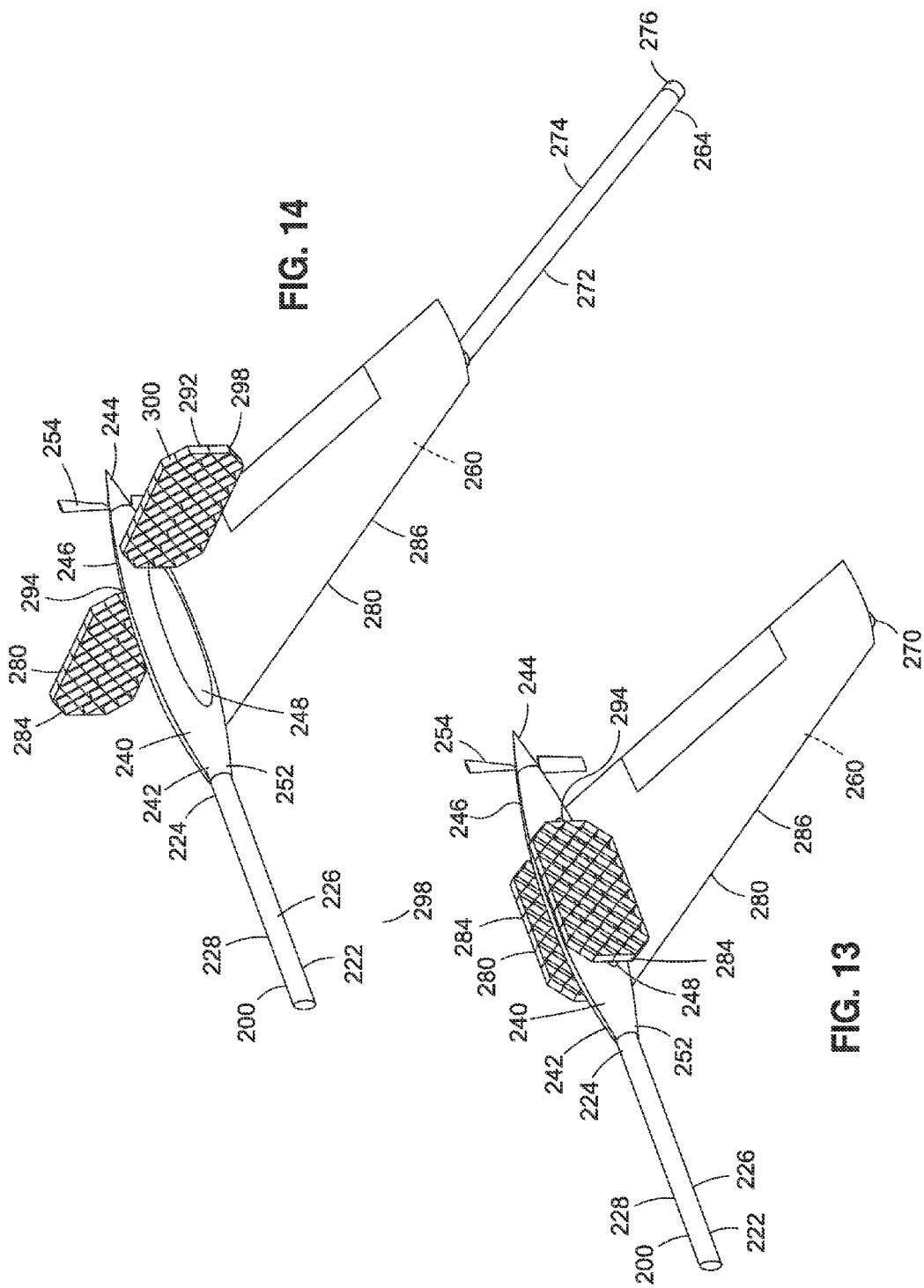

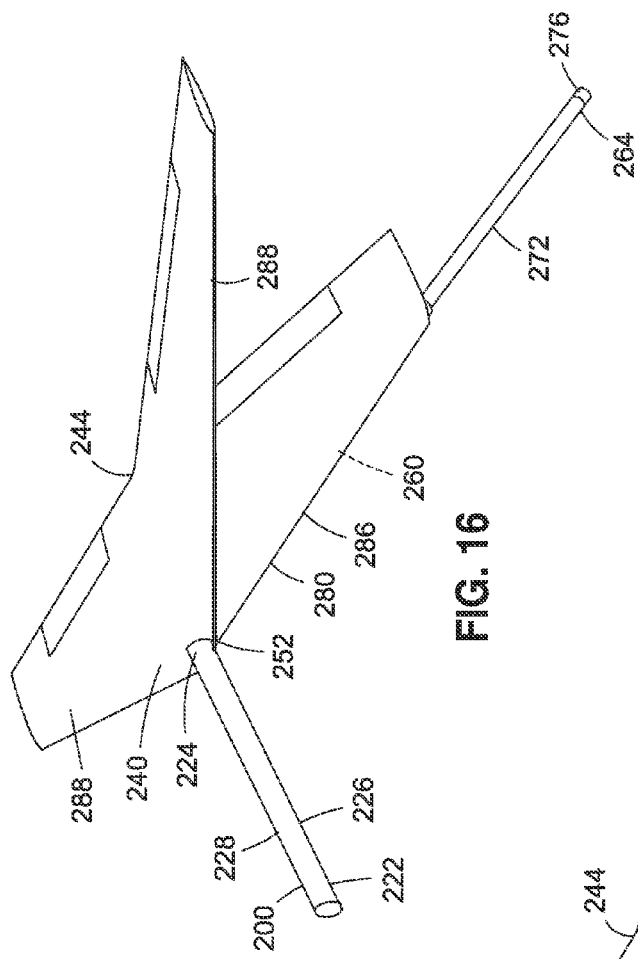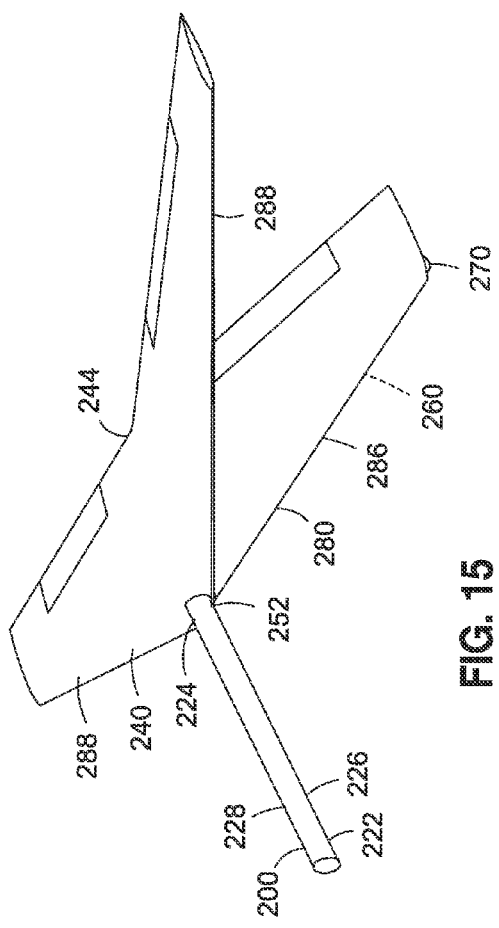

AERIAL REFUELING SYSTEM AND METHOD

FIELD

The present disclosure relates generally to aerial refueling and, more particularly, to a system and method for refueling receptacle-equipped aircraft.

BACKGROUND

Aerial refueling involves the in-flight transfer of fuel from a tanker aircraft to a receiver aircraft. The transfer of fuel to the receiver aircraft may increase the range and endurance of the receiver aircraft. The transfer of fuel to the receiver aircraft may also increase the payload capability of the receiver aircraft.

In one conventional method of aerial refueling, a semi-rigid, pivoting boom may be mounted to an underside of a fuselage of a tanker aircraft on the aft end thereof. A receiver aircraft may include a receptacle configured to mate with the pivoting boom. The pilot of the receptacle-equipped receiver aircraft may maneuver into close proximity to the tanker aircraft. The pivoting boom may be steered into alignment with the receptacle on the receiver aircraft until the boom locks with the receptacle. After establishing the connection between the boom and the receptacle, fuel may be transferred from the tanker aircraft to the receiver aircraft.

Unfortunately, current tanker aircraft include only one (1) pivoting boom such that only one (1) receptacle-equipped receiver aircraft may be refueled at a time. Furthermore, the pivoting boom extends a relatively short distance from the aft end of the tanker aircraft such that when the pivoting boom is coupled to the receptacle, a relatively small spacing separates the receiver aircraft from the tanker aircraft. The relatively short length and semi-rigid nature of the pivoting boom limits the capability for relative movement between the tanker aircraft and the receiver aircraft which may present challenges when refueling in turbulent conditions. In addition, the pivoting boom is stored on an exterior of the tanker aircraft which generates a significant amount or aerodynamic drag, and which has a detrimental impact on the radar signature of the tanker aircraft.

As can be seen, there exists a need in the art for a refueling system and method that allows for the simultaneous refueling of two (2) or more receptacle-equipped receiver aircraft, and which additionally allows for an increased amount of relative movement and increased spacing between the tanker aircraft and the receiver aircraft when coupled together during refueling. Furthermore, there exists a need in the art for a refueling system and method that may be stored internally in the tanker aircraft to minimize or eliminate contributions to aerodynamic drag, and to preserver a low-observable or stealth capability of the tanker aircraft.

SUMMARY

The above-noted needs associated with aerial refueling are specifically addressed and alleviated by the present disclosure which provides a refueling system that may include a refueling hose and a refueling drone coupled to the hose aft end. The refueling drone may be rearwardly deployable from the tanker aircraft such that the refueling drone is towed by the refueling hose behind the tanker aircraft. The refueling drone may be engaged to a receiver aircraft for transferring fuel from the tanker aircraft to the receiver aircraft.

In a further embodiment, disclosed is a refueling system that may include a refueling hose that may be extendable from a wing pod mounted to a wing of a tanker aircraft. A refueling drone may be coupled to the refueling hose and may be rearwardly deployable from the wing pod such that the refueling drone may be towed by the refueling hose behind the tanker aircraft. The refueling drone may include a refueling boom that may be pivotable outwardly from the refueling drone and may be configured to mate with a receptacle of a receiver aircraft. The refueling drone may further include a plurality of control surfaces that may be positioned on the refueling drone and may be controllable for attitude control of the refueling drone.

Also disclosed is a method of refueling an aircraft. The method may include extending a refueling hose from a tanker aircraft, and towing a refueling drone coupled to an end of the refueling hose. The method may further include engaging the refueling drone with a receiver aircraft, and transferring fuel from the tanker aircraft to the receiver aircraft.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 2 is a side view of a tanker aircraft refueling a receiver aircraft using the refueling system disclosed herein;

FIG. 3 is a front view of a pair of refueling systems coupled to a pair of receiver aircraft during a refueling operation;

FIG. 5 is a perspective view of an aft end of a wing pod from which the refueling drone may be extended and retracted;

FIG. 6 is a perspective view of an embodiment of the refueling drone being deployed rearwardly from the tanker aircraft and the initial deployment of a drogue from a drone aft end;

FIG. 7 is a perspective view of the refueling drone during the initial deployment of the refueling boom and a plurality of control surfaces;

FIG. 8 is a perspective view of the refueling drone with the refueling boom telescopically extended and the control surfaces in the deployed position;

FIG. 9 is a rear perspective view of the refueling drone of FIG. 8;

FIG. 10 is a side view of the refueling drone of FIG. 9;

FIG. 11 is a perspective view of an embodiment of a refueling drone having grid fins and air brakes shown in a retracted position;

FIG. 12 is a perspective view of the refueling drone of FIG. 11 showing the refueling boom and the control surfaces in a deployed position;

FIG. 13 is a perspective view of an embodiment of a refueling drone having a directional fin and grid fins shown in a retracted position and further illustrating a ram air turbine mounted on the drone aft end;

FIG. 14 is a perspective view of the refueling drone of FIG. 13 showing the refueling boom and the control surfaces in a deployed position;

FIG. 15 is a perspective view of an embodiment of a refueling drone configured as a lifting surface and including a directional fin;

FIG. 16 is a perspective view of the refueling drone of FIG. 15 showing the refueling boom in the deployed position;

DETAILED DESCRIPTION

Figure 1:
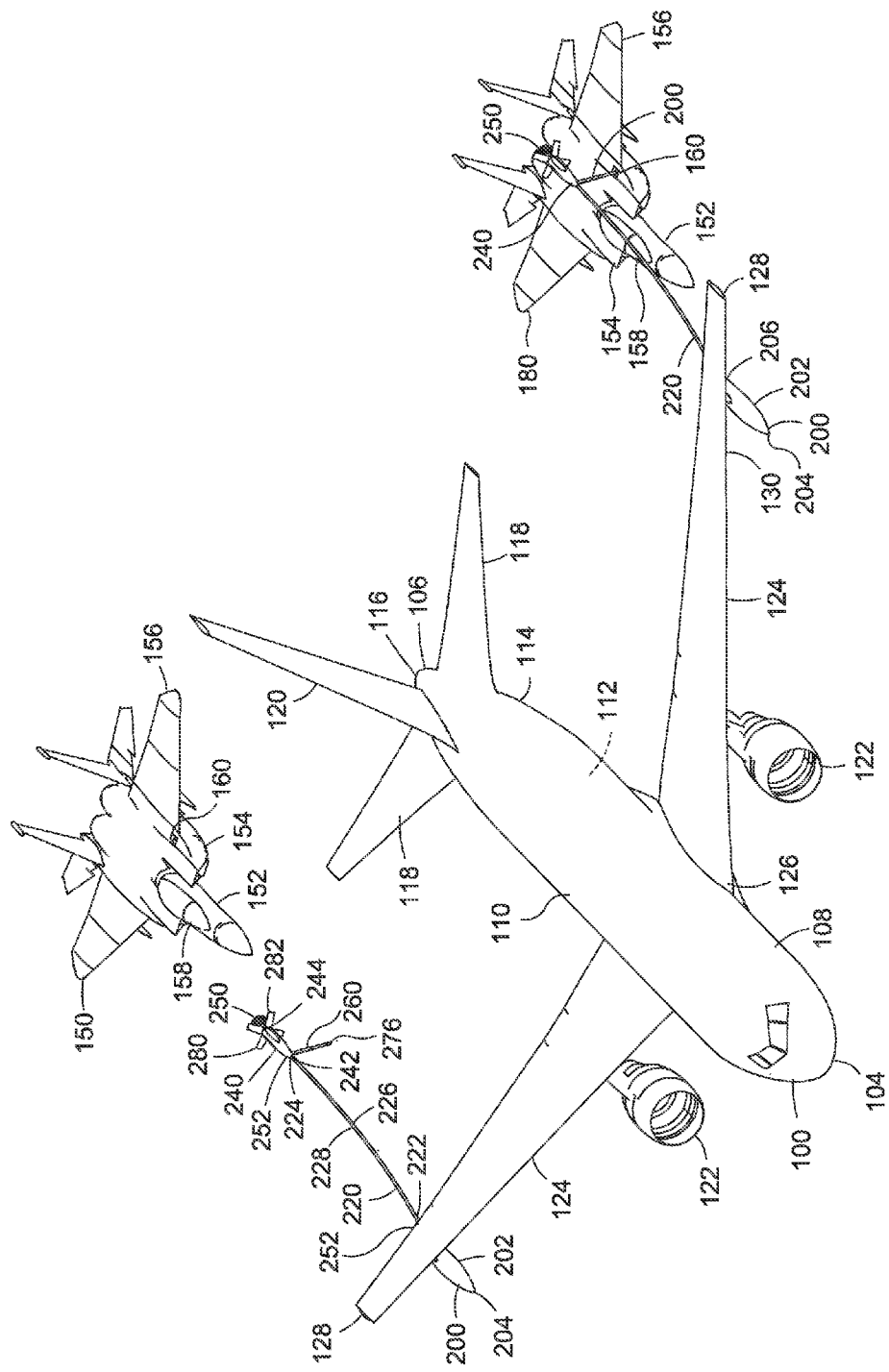
FIG. 1 is a perspective illustration of the tanker aircraft in a refueling operation with receiver aircraft by means of a refueling drone coupled to a refueling hose and towed behind the tanker aircraft.

Referring now to the drawings wherein the showings are for purposes of illustrating various embodiments of the present disclosure, shown in FIG. 1 is a perspective view of a tanker aircraft 100 outfitted with a pair of refueling systems 200 as disclosed herein for in-flight refueling of a pair of receiver aircraft 150. One of the receiver aircraft 150 in FIG. 1 is shown coupled to a refueling drone 240 extending rearwardly from one wing 124 of the tanker aircraft 100 to transfer fuel from the tanker aircraft 100 to the receiver aircraft 150. The other receiver aircraft 150 in FIG. 1 is shown maneuvering into position below and behind a refueling drone 240 towed behind another wing 124 of the tanker aircraft 100 such that the refueling boom 260 may be engaged with the receiver aircraft 150.

In FIG. 1, the tanker aircraft 100 may include a fuselage 108 and may be configured to carry a fuel supply for in-flight refueling of one or more receiver aircraft 150 using one or more of the aerial refueling systems 200. The fuselage 108 may extend from a nose at a forward end 104 of the tanker aircraft 100 to an empennage 116 at an aft end 106 of the tanker aircraft 100. The empennage 116 may include one or more tail surfaces such as a vertical tail 120 (e.g., a vertical fin and/or rudder) and/or a horizontal tail 118 (e.g., a horizontal stabilizer and/or elevator) for directional control and stability of the tanker aircraft 100. The tanker aircraft 100 may additionally include a pair of wings 124 as mentioned above and may further include one or more propulsion units 122.

In FIG. 1, in an embodiment, each refueling system 200 may include a wing pod 202. Each wing pod 202 may be mounted to a wing 124 such as to an underside 130 of the wing 124 and may be configured to store a refueling hose 220 and/or a refueling drone 240. As described in greater detail below, the refueling drone 240 may be extended or deployed rearwardly from a pod opening 208 (FIG. 5) in the pod aft end 206 of the wing pod 202 such that the refueling drone 240 is towed behind the tanker aircraft 100 by the refueling hose 220. Two or more wing pods 202 may be mounted to the tanker aircraft 100 for simultaneous refueling of two or more receiver aircraft 150. However, pods may be mounted to areas of the aircraft other than the wings 124. For example, the tanker aircraft 100 may include one or more fuselage pods (not shown) mounted to the exterior of the fuselage 108. In an alternative embodiment, the refueling system 200 may also be stored within and deployed from an aircraft interior 112 of the tanker aircraft 100. For example, the refueling hose 220 and refueling drone 240 may be stored in the fuselage 108 or body of the tanker aircraft 100. The refueling drone 240 may be deployed through a door (not shown) that may be provided on an underside 114 of the body or fuselage 108 such as a weapon bay door (not shown) or an aft door (not shown) provided on an aft end of fuselage 108.

It should also be noted that although the refueling system 200 of the present disclosure is described in the context of a fixed-wing tanker aircraft 100 such as the tube-and-wing aircraft illustrated in FIG. 1, any one of the various refueling system 200 embodiments disclosed herein may be applied to any aircraft of any configuration, without limitation. For example, the refueling system 200 may be applied to any civil, commercial, or military aircraft, and to any fixed-wing aircraft or rotary-wing aircraft, without limitation. In addition, embodiments of the refueling system 200 may be applied to alternative aircraft configurations and are not limited to the tube-and-wing aircraft configuration illustrated in FIG. 1. For example, the disclosed embodiments may be applied to hybrid wing-body aircraft or blended-wing aircraft. Furthermore, the refueling system 200 may be used for refueling any type of receiver aircraft, without limitation, including any fixed-wing receiver aircraft and any rotary-wing receiver aircraft for civil, commercial, and/or military purposes.

FIG. 2 is a side view of a tanker aircraft 100 showing a refueling drone 240 deployed from a wing pod 202 mounted on an underside 130 of wing 124 of the tanker aircraft 100. The refueling hose 220 may have a hose forward end 222 and a hose aft end 224 and may be extendable from the tanker aircraft 100 in flight. The refueling drone 240 may have a drone forward end 242, a drone aft end 244, and a drone side 246, and may be provided with a generally aerodynamic or streamlined shape. The drone forward end 242 may be coupled to the hose aft end 224. The refueling drone 240 may be rearwardly deployable from the tanker aircraft 100 into the air stream such that the refueling drone 240 may be towed by the refueling hose 220 behind the tanker aircraft 100. The refueling drone 240 may include a drogue 250 that may be mounted on the drone aft end 244. The drogue 250 may be deployed as the refueling drone 240 slides out of the pod opening 208 on the drone aft end 244 as described in greater detail below. The hose forward end 222 may remain coupled to the wing pod 202 such as to a hose drum (not shown) that may be mounted in the wing pod 202 or in the wing 124 or fuselage 108 of the tanker aircraft 100. The hose aft end 224 may be coupled to the refueling drone 240.

In FIG. 2, the drogue 250 may generate aerodynamic drag which may draw the refueling drone 240 out of the wing pod 202 in a controller manner to minimize or avoid aerodynamically-induced oscillations or whipping action of the refueling drone 240 as the refueling drone 240 is towed through the air stream. As can be seen, the refueling drone 240 may be towed at an elevation that may be lower than the elevation of the wing pod 202 or other location from where the refueling drone 240 is deployed. The aerodynamic drag generated by the drogue 250 may also generate tension on the refueling hose 220 to maintain a proper catenary in the refueling hose 220 and to maintain the refueling hose 220 in a generally horizontal orientation. As described in greater detail below, a horizontal orientation of the refueling drone 240 may also facilitate control and maneuvering of the refueling drone 240 by using one or more control surfaces 280 (e.g., at least one control surface 280) such that the refueling boom 260 may be maneuvered or guided into engagement with a receptacle 160 on the receiver aircraft 150. In this regard, the drogue 250 and/or the control surfaces 280 may aerodynamically stabilize the refueling drone 240. Advantageously, the refueling hose 220 may be provided in a relatively long length which may allow the refueling drone 240 to be deployed at a relatively long distance behind the tanker aircraft 100 to maximize the forward-aft spacing between the tanker aircraft 100 and the receiver aircraft 150. The maximized forward-aft spacing may minimize the risk of physical contact between the tanker aircraft 100 and the receiver aircraft 150 when refueling in turbulent conditions.

FIG. 3 is a front view of a tanker aircraft 100 refueling a pair of receiver aircraft 150. Each one of the receiver aircraft 150 may be coupled to the tanker aircraft 100 by means of a refueling system 200. In the embodiment shown, each refueling system 200 may include a wing pod 202, a refueling hose 220, and a refueling drone 240 coupled to the refueling hose 220. The refueling drone 240 may be towed at an elevation that may be lower than the wing pod 202 as indicated above. In addition, each refueling drone 240 may include a refueling boom 260. In an embodiment, the refueling boom 260 may be pivoted downwardly from a retracted position 270 against the refueling drone 240, and into a deployed position 272. The downward pivoting of the refueling boom 260 may allow the receiver aircraft 150 to be positioned at a relatively large vertical spacing below the tanker aircraft 100 for improved safety. In an embodiment, the refueling boom 260 may further include one or more boom sections 274 that may be telescopically extended to increase the overall length of the refueling boom 260 and allow the receiver aircraft 150 to be positioned further below the tanker aircraft 100. In this regard, the configuration of the refueling drone 240 may allow the receiver aircraft 150 to fly below and/or outside the location of turbulent air generated by the wings 124, fuselage 108, and/or propulsion units 122 of the tanker aircraft 100. In addition, the wing pods 202 of the tanker aircraft 100 may be mounted proximate the wing tips 128 of the tanker aircraft 100 which may provide increased lateral spacing between simultaneously-refueled receiver aircraft 150 to minimize the risk of contact of the receiver aircraft 150.

Figure 4:
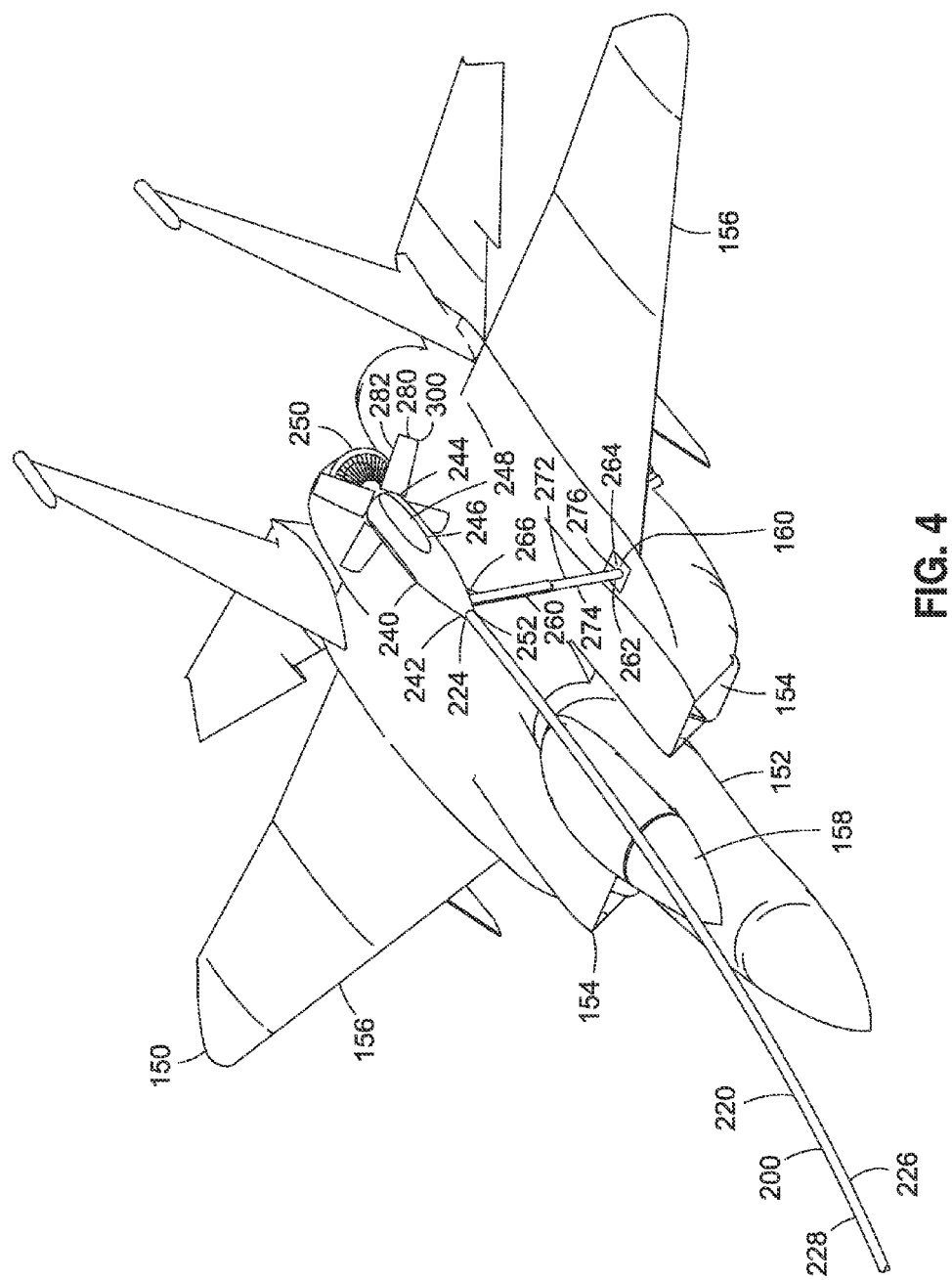
FIG. 4 is a perspective view of a refueling boom engaged to a receiver aircraft.

FIG. 4 shows the engagement of an embodiment of a refueling system 200 with a receiver aircraft 150. In the embodiment shown, the receiver aircraft 150 may include a fuselage 152, a pair of wings 156, and one or more propulsion units 154. The receiver aircraft 150 may include a receptacle 160 that may be mounted below an outer mold line of the receiver aircraft 150. In an embodiment, the receptacle 160 may be covered by a movable panel or door (not shown) that may be flush with the outer mold line of the receiver aircraft 150. The receptacle 160 may be configured to mate with a fitting 276 that may be included on a free end 264 of the refueling boom 260. The refueling boom 260 may be configured as a relatively rigid and/or stiff member that may be outwardly and/or downwardly pivotable from the refueling drone 240. The refueling boom 260 may be pivoted about a boom pivot end 262 that may be coupled to the refueling drone 240 such as at a drone forward end 242. The refueling boom 260 may be pivoted from a retracted position (not shown) to a deployed position 272 as shown in FIG. 4. Fuel may be transferred from the tanker aircraft 100, through the refueling hose 220, through the refueling boom 260, and into the receiver aircraft 150 upon the establishment of the connection of the refueling boom 260 to the receptacle 160. In an embodiment, the refueling drone 240 may have an aerodynamically contoured cross sectional profile such as an airfoil-shaped cross section. The airfoil-shaped cross sectional profile may be provided as a generally elongated teardrop shape to minimize aerodynamic drag and turbulence that may otherwise be generated by the refueling boom 260 in the deployed position 272.

In FIG. 4, in an embodiment, the refueling system 200 may include a communications cable 226 and/or a power cable 228 that may be extended from the tanker aircraft 100 (e.g., from the wing pod) and along the refueling hose 220 to the refueling drone 240. In an embodiment, the communications cable 226 and/or the power cable 228 may be embedded within the wall (not shown) of the refueling hose 220. The communications cable 226 may also extend along the refueling boom 260 and may be connectable with the receiver aircraft 150 when the fitting 276 on the refueling boom 260 is engaged to the receptacle 160 on the receiver aircraft 150. The communications cable 226 may be configured to engage a communications fitting (not shown) on the receiver aircraft 150 to provide communications capability between the tanker aircraft 100 and the receiver aircraft 150 when the refueling boom 260 fitting 276 is mated to the receptacle 160 of the receiver aircraft 150. The communications cable 226 may advantageously provide talk-through capability between the tanker aircraft 100 and the receiver aircraft 150 to provide a means for minimizing or avoiding radio chatter such as in a stealth scenario.

In FIG. 4, in an embodiment, the refueling system 200 may include one or more video cameras 252. For example, one or more video cameras 252 may be mounted to the tanker aircraft 100 such as on a wing pod 202 and/or on the fuselage 108 for observing the position of the refueling drone 240 and refueling boom 260 relative to the receiver aircraft 150. The video camera 252 may be configured to provide real time images of the refueling drone 240, the refueling boom 260, and/or receiver aircraft 150 during maneuvering of the refueling boom 260 into engagement with the receiver aircraft 150. In an embodiment, the refueling system 200 may include a display device (not shown) that may be mounted in the tanker aircraft 100 to allow a drone operator in the tanker aircraft 100 to observer the position of the refueling boom 260 relative to the receiver aircraft 150. In this regard, the video camera 252 may form a part of a refueling drone control system (not shown) to allow for manual or autonomous maneuvering of the refueling boom 260 fitting 276 into engagement with the receptacle 160 of the receiver aircraft 150.

In FIG. 4, the tanker aircraft 100 may also include a refueling window (not shown) for allowing a drone operator to observe the position of the refueling drone 240 relative to the receiver aircraft 150. Depending upon the configuration of the receiver aircraft 150, the pilot of the receiver aircraft 150 may be unable to see the receptacle 160. For example, as shown in FIGS. 2 and 4, the receptacle 160 may be positioned aft of the cockpit 158 or aft of the pilot's field of view such that the pilot of the receiver aircraft 150 may be unable to assist in maneuver the receiver aircraft 150 for aligning the receptacle 160 with the refueling boom 260. Maneuvering of the refueling drone 240 and engagement of the refueling boom 260 with the receptacle 160 may rely upon a drone operator to observe the position of the refueling boom 260 and the receiver aircraft 150 using a display device showing a live video feed from the video camera 252, and/or through a window (not shown). The video camera 252 and/or window may facilitate the drone operator in manipulating the control surfaces 280 on the refueling drone 240 to maneuver the refueling boom 260 into engagement with the receptacle 160

In FIG. 4, the refueling system 200 may optionally include the power cable 228 for providing power to the refueling drone 240 such as for powering the video camera 252. Power from the power cable 228 may also be used for operating the refueling boom 260 such as deploying and retracting the refueling boom 260 and/or telescopically extending the boom section 274. Power provided by the power cable 228 may also be used for operating or manipulating (e.g., deploying, retracting, controlling) the control surfaces 280, and/or for operating (e.g., deploying, retracting) the drogue 250, or any other system that may be associated with or mounted to the refueling drone 240.

In FIG. 5, shown is an embodiment of a wing pod 202 from which the refueling drone 240 may be deployed. As indicated above, in an embodiment, the wing pod 202 may be mounted to an exterior of a wing 124 of the tanker aircraft 100 such as adjacent to a wing tip 128 or midway between a wing root 126 and a wing tip 128, or at any other location on the wing 124. For example, the wing pod 202 may be suspended by a pylon (not shown) from an underside 130 of a wing 124. The wing pod 202 may have a pod forward end 204 and a pod aft end 206. The pod aft end 206 may have a pod opening 208. The wing pod 202 may be configured to at least partially contain the refueling drone 240 in a retracted position within the wing pod 202. The wing pod 202 may have an aerodynamically contoured or streamlined shape comprising a general teardrop shape, having a rounded nose or pointed nose, and a smoothly curved outer contour being open on the pod aft end 206.

In FIG. 5, the wing pod 202 may be sized and configured to store the refueling hose 220 such as on a hose drum (not shown) within the wing pod 202 when the refueling drone 240 is in a retracted position. However, for a relatively large diameter refueling hose 220, it may be preferable or necessary to store the refueling hose 220 in a generally straight configuration due to the limited ability to coil a large diameter refueling hose 220 on a hose drum of small enough diameter to fit within the narrow confines of the wing pod 202. In this regard, the refueling hose 220 may also be stored in a generally non-coiled arrangement within the wing 124 and/or fuselage 108 of the tanker aircraft 100. For example, the refueling hose 220 may be stored along a length of the wing 124 and may be extended and retracted out of the wing pod 202 during deployment of the refueling drone 240. In embodiments wherein the refueling hose 220 is stored in the aircraft interior 112 and deployed and retracted out of the aircraft body 110 or fuselage 108, the refueling hose 220 may be stored on a hose drum (not shown) that may be mounted within the fuselage 108, or the refueling hose 220 may be stored in a lengthwise arrangement along a length of the fuselage 108.

In FIG. 6, shown is an embodiment of the refueling drone 240 being deployed rearwardly out of the wing pod 202 wherein the control surfaces 280 of the refueling drone 240 are retracted. As indicated above, the refueling drone 240 may be drawn outwardly from the wing pod 202 by aerodynamic drag generated by the initial deployment of the drogue 250 on the drone aft end 244. The drogue 250 may pull the refueling drone 240 away from the aircraft in a controlled manner with minimal aerodynamically-induced oscillations of the refueling drone 240. In addition, the aerodynamic drag generated by the drogue 250 may provide tension in the refueling hose 220 to maintain a desired catenary in the refueling hose 220 so that the refueling hose 220 is maintained in a generally horizontal orientation as mentioned above. A horizontal orientation of the refueling drone 240 may facilitate the alignment of the refueling boom 260 as fuel is transferred from the tanker aircraft 100 to the receiver aircraft 150.

In FIG. 7, shown is the drogue 250 in a fully deployed state, and the refueling boom 260 and the control surfaces 280 in an initially or partially deployed state. As indicated above, the control surfaces 280 may be outwardly deployed to facilitate control of the attitude (e.g., any combination of roll 302, pitch 304, and yaw 306) of the refueling drone 240 and/or to generate increased aerodynamic drag in addition to the aerodynamic drag generated by the drogue 250. In an embodiment, the control surfaces 280 may be manually controlled such as by a drone operator, or the control surfaces 280 may be autonomously controlled such as by a system of proximity sensors (not shown) providing input to a controller (not shown). The proximity sensors may monitor the distance and position of the refueling boom 260 fitting 276 relative to the receptacle 160 on the receiver aircraft 150 and provide input to the controller which may manipulate the control surfaces 280 for maneuvering the refueling drone 240.

In FIG. 8, shown is the refueling drone 240 with the control surfaces 280 in a fully deployed position 272. The refueling boom 260 is shown in a fully deployed position 272. The refueling boom 260 may include the above-mentioned boom section(s) 274 that may be telescopically extended to increase the overall length of the refueling boom 260. The control surfaces 280 may be independently controllable to adjust the attitude of the refueling drone 240.

FIG. 9 is a perspective view from an aft end of the refueling drone 240 and illustrating the drogue 250 fully deployed. Also shown are the aerodynamic control surfaces 280 which may be mounted to the refueling drone 240. In an embodiment, the control surfaces 280 may be angularly distributed around the outer circumference of the refueling drone 240. One or more of the control surfaces 280 may be mounted proximate a drone aft end 244 of the refueling drone 240 such that a center of aerodynamic pressure (not shown) of the control surfaces 280 may be located aft of a center of gravity (not shown) of the refueling drone 240. Each one of the control surfaces 280 may include a control surface pivot end 290 and a control surface free end 292. The control surface 280 may be outwardly pivotable about the control surface pivot end 290 by a control surface actuator 294 from a refracted position 298 to a deployed position 300. Each control surface 280 may define a control surface pivot angle 296 in the deployed position 300 relative to a longitudinal axis 308 of the refueling drone 240. In the retracted position 298, each one of the control surfaces 280 may be retractable against a drone side 246 of the refueling drone 240.

In FIG. 9, the control surfaces 280 may be configured as air brakes 282 having an outer contour that may be a complementary to an outer contour of the refueling drone 240 when the control surfaces 280 are in the refracted position 298. Although the air brakes 282 are shown as being outwardly pivotable about a control surface pivot end 290 at a forward end of the control surface, the control surfaces 280 may be outwardly pivotable or deployed by other means. For example, the control surface pivot end 290 of each control surface 280 may be located at an aft end of each control surface 280 relative to an oncoming direction of the air stream. Alternatively, the control surfaces 280 may be deployed by radially translating the control surfaces 280 from a buried position (not shown) within the refueling drone 240 to a protruding position (not shown) wherein at least a portion of the control surface 280 protrudes outwardly from an outer surface of the refueling drone 240.

In this regard, the control surfaces 280 may be configured in any one of a variety of different configurations for deploying outwardly into an air stream to provide control over the attitude of the refueling drone 240. The orientation of the control surface 280 (e.g., the control surface pivot angle 296) may be controlled as a means of maneuvering the refueling boom 260 fitting 276 into engagement with the receptacle 160 of the receiver aircraft 150. The attitude of the refueling drone 240 may be defined in terms of roll 302, pitch 304, and yaw 306 about a respective longitudinal axis 308, lateral axis 310, and vertical axis 312 of the refueling drone 240. The control surfaces 280 may be independently controllable for providing attitude control during engagement of the refueling boom 260 with the receiver aircraft 150, and for disengagement of the refueling boom 260 from the receiver aircraft 150.

FIG. 10 is a side view of the refueling drone 240 showing the refueling boom 260 pivoted into the deployed position 272. In an embodiment, the refueling boom 260 may be configured as a relatively rigid member that may be pivotable from a retracted position 270 into a deployed position 272 using a boom pivot actuator 266. In the retracted position 270, the refueling boom 260 may be disposed against a drone side 246 of the refueling drone 240 and may be generally aligned with a lengthwise direction of the refueling drone 240. In an embodiment, the refueling boom 260 may be received within an interior of the refueling drone 240. For example, when the refueling boom 260 is in the retracted position 270, an outer surface of the refueling boom 260 may be generally flush with an outer surface of the drone sides 246. The refueling boom 260 may define a boom pivot angle 268 relative to the drone longitudinal axis 308 when the refueling boom 260 is in the deployed position 272.

FIG. 11 shows an embodiment of a refueling drone 240 wherein the control surfaces 280 are configured as grid fins 284 and air brakes 282 which are shown in a retracted position 298. The refueling drone 240 may include a plurality of drone flats 248 corresponding to the quantity of grid fins 284 that may be mounted to the refueling drone 240. The drone flats 248 may provide a surface against which the grid fins 284 may lie in the refracted position 298. The grid fins 284 may be formed as relatively stiff, elongated panels having perforations or webs to allow air to pass through the grid fins 284. As indicated above, each grid fin 284 may pivot outwardly from a control surface pivot end 290 which may be located at an aft end of each grid fin 284. Each one of the grid fins 284 may be independently controllable to provide controllability of the attitude of the refueling boom 260, and to respond to abrupt changes in the attitude of the refueling drone 240 due to turbulence and/or wind gusts.

FIG. 12 shows the refueling drone 240 of FIG. 11 with the refueling boom 260 and the air brakes 282 in the deployed position 300. The air brakes 282 are shown mounted on the drone aft end 244. In the embodiment shown, the air brakes 282 may be angularly positioned relative to the grid fins 284 such that when the air brakes 282 and the grid fins 284 are in the deployed position 300, the air brakes 282 fall between the gaps between the grid fins 284 when the refueling drone 240 is viewed along a direction of the air stream. The air brakes 282 may be independently controllable to facilitate control of the attitude of the refueling drone, and/or to control the aerodynamic drag generated by the air brakes 282 for maintaining the desired catenary in the refueling hose 220.

FIG. 13 shows an embodiment of a refueling drone 240 having a vertically-oriented directional fin 286 and a plurality of grid fins 284. The grid fins 284 are shown in a retracted position 298 against the drone flats 248. The directional fin 286 extends downwardly and may house at least a portion of the refueling boom 260. The directional fin 286 may advantageously provide straight-line-tracking capability for the refueling drone 240. One or more control tabs may be mounted on a trailing edge of the directional fin 286 for providing some degree of control of the attitude of the refueling drone 240 in combination with control that may be provided by manipulating the grid fins 284.

FIG. 14 shows the refueling drone 240 of FIG. 13 with the grid fins 284 in a deployed position 300 and the refueling boom 260 telescopically extended. Also shown is a ram air turbine 254 that may be mounted on the drone aft end 244. The ram air turbine 254 may be configured to rotate in response to the air stream and generate power for operating the refueling drone 240. For example, the ram air turbine 254 may be coupled to an electric generator (not shown) that may be mounted within the refueling drone 240 and may be configured to provide power to the boom pivot actuator 266 for pivotably deploying and retracting the refueling boom 260. Power from the ram air turbine 254 may also be used to telescopically extend the refueling boom 260 as shown in FIG. 14, and/or to telescopically extend the boom section 274 shown in FIGS. 8-10 and 12. Power from the ram air turbine 254 may additionally be used for deploying, retracting, and manipulating the control surfaces 280. In an embodiment not shown, power may also be provided to the refueling drone 240 by a relatively small waterwheel (not shown) that may be mounted within the refueling hose 220 and which may be configured to rotate in response to the flow of fuel through the refueling hose 220 for generating power for the refueling drone 240.

FIGS. 15-16 show an embodiment of a refueling drone 240 configured as a lifting surface 288. The refueling drone 240 further includes a downwardly extending directional fin 286 that may be configured similar to the directional fin 286 shown in the FIGS. 13-14. The lifting surface 288 in FIG. 15 may be configured to generate a lifting force for the refueling drone 240. In this regard, the lifting surface 288 may be configured as a pair of generally horizontally-oriented aerodynamic surfaces that may provide a lifting force for supporting the mass of the refueling drone 240. The lifting surfaces 288 may also provide aerodynamic stability with regard to the vertical position of the refueling drone 240 relative to position of the receiver aircraft 150. In an embodiment, each lifting surface 288 may include one or more movable control tabs for controlling the attitude and/or the vertical position of the refueling drone 240 relative to the receiver aircraft 150. In any of the embodiments disclosed herein, a lifting surface 288 or a directional fin 286 may also include decelerons (e.g., split control tabs) on the trailing edge of the lifting surface 288 to generate increased aerodynamic drag for the refueling drone 240. The lifting surface 288 may be provided with a symmetric airfoil section such that minimal lift is generated, and the lifting surface 288 functions to provide stability with regard to the vertical position of the refueling boom 260 relative to the receiver aircraft 150. FIG. 16 also shows the refueling drone 240 of FIG. 15 with the refueling boom 260 in the deployed position 272.

Figure 17:
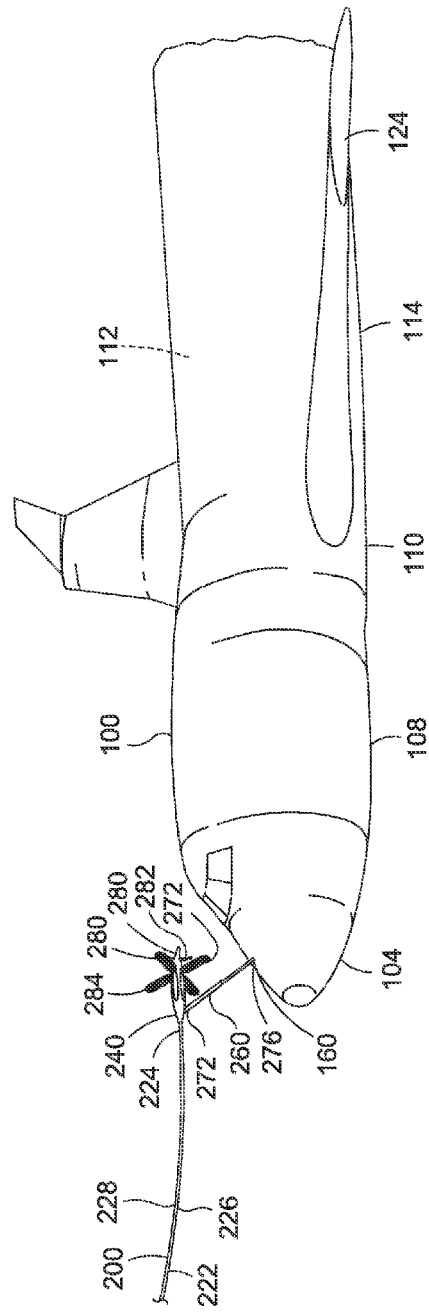
FIG. 17 is a perspective view of the refueling system coupled to a relatively large transport aircraft during a refueling operation.

FIG. 17 shows an embodiment of the refueling system 200 coupled to a transport aircraft as the receiver aircraft 150. The refueling drone 240 includes a refueling boom 260 with a boom section 274 telescopically extended to provide clearance between the refueling drone 240 and the receiver aircraft 150. The refueling drone 240 may be configured similar to the arrangement shown in FIG. 12 wherein the refueling drone 240 may include a plurality of control surfaces 280 such as grid fins 284 and/or air brakes 282. As indicated above, the grid fins 284 and the air brakes 282 may generate aerodynamic drag for controlling the catenary in the refueling hose 220. In addition, the grid fins 284 and the air brakes 282 may facilitate control of the attitude (e.g., roll 302, pitch 304, and yaw 306) of the refueling drone 240.

Figure 18:
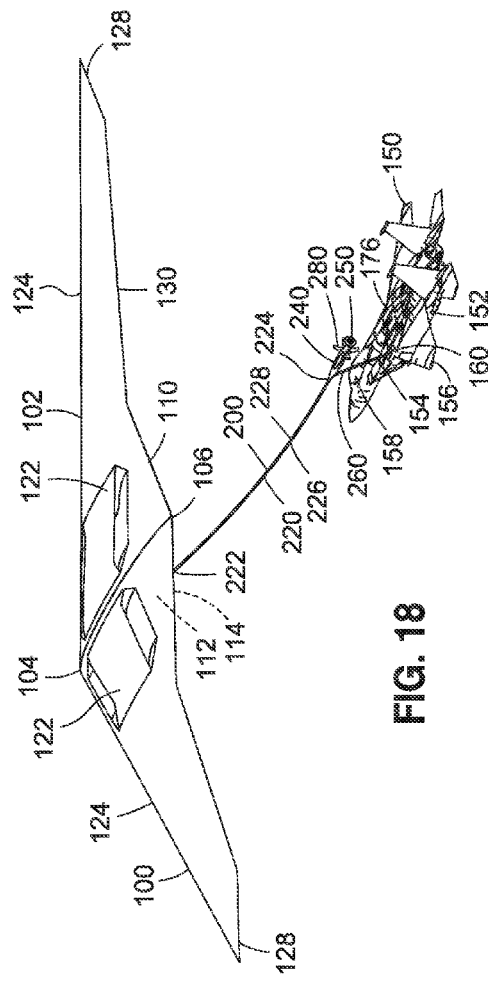
FIG. 18 is a perspective view of the refueling system extended rearwardly from an aircraft body of an unmanned air vehicle refueling a receiver aircraft.

FIG. 18 shows an embodiment of the refueling system 200 mounted to an unmanned air vehicle 102 configured as a low-observable unmanned air vehicle 102 serving as the tanker aircraft 100. The refueling drone 240 may be stored in an interior of the aircraft body 110 of the unmanned air vehicle 102 which may advantageously preserve the stealth capability of a low-observable unmanned air vehicle 102. The refueling drone 240 may be deployed from the interior of the aircraft body 110 and towed behind the refueling hose 220 which may be extended rearwardly from the aircraft body 110. The refueling drone 240 and refueling hose 220 may be deployed through a door (not shown) that may be formed in an underside 114 of the aircraft body 110 of the unmanned air vehicle 102. In an embodiment, one or more video cameras 252 may be mounted on the unmanned air vehicle 102 and/or on the refueling drone 240 and/or refueling boom 260 for providing real-time images of the position of refueling boom 260 and the receiver aircraft 150. Such images may be relayed to a manned aircraft (not shown) or to a ground station (not shown) which may have one or more display devices to allow a ground-based drone operator to maneuver the refueling boom 260 into alignment with the receptacle 160 on the receiver aircraft 150.

Figure 19:
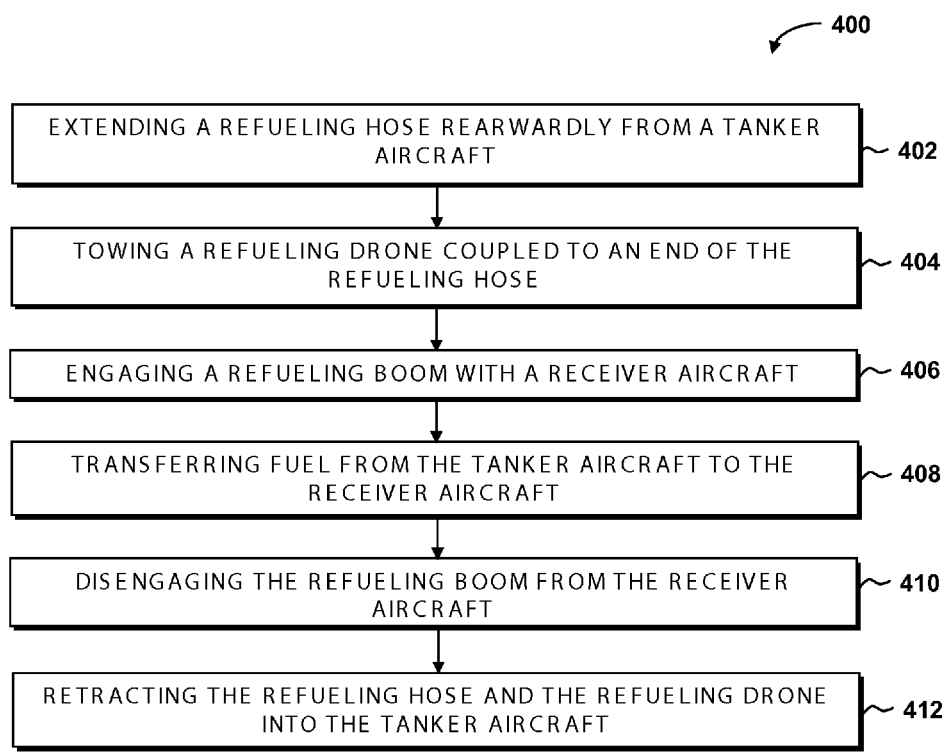
FIG. 19 is a flow chart illustrating one or more operations that may be included in a method of refueling an aircraft.

FIG. 19 shows a flowchart of an embodiment of a method 400 of refueling an aircraft. Step 402 of the method 400 of FIG. 19 may include extending a refueling hose 220 from a tanker aircraft 100. In an embodiment, the method may include retracting and extending a refueling drone 240 into and out of a wing pod 202, a fuselage pod (not shown), or an aircraft interior 112. As shown in FIG. 1-3, one or more wing pods 202 may be mounted to a wing 124 of the tanker aircraft 100. Each wing pod 202 may be configured for storing the refueling hose 220 in the wing pod 202. Upon deploying the refueling drone 240 from the tanker aircraft 100, the method may further include providing power to the refueling drone 240 using a power cable 228 extending along the refueling hose 220, and operating (e.g., deploying, retracting, controlling) the control surfaces 280 and/or the refueling boom 260 using the power provided by the power cable 228. Alternatively, the method may include generating power for the refueling drone 240 using a ram air turbine 254 mounted on a drone aft end 244 of the refueling drone 240 as shown in FIGS. 13-14, and operating the control surfaces 280 and the refueling boom 260 using the power generated by the ram air turbine 254 as mentioned above.

Step 404 of the method 400 of FIG. 19 may include towing the refueling drone 240 coupled to an end of the refueling hose 220 as shown in FIGS. 1-2. Deployment of the refueling drone 240 such as from the wing pod 202 may be facilitated by deploying a drogue 250 from a drone aft end 244 of the refueling drone 240. The method may include generating aerodynamic drag using the drogue 250 as a means to generate tension in the refueling hose 220 so that the refueling hose 220 is maintained in a generally horizontal orientation. A horizontal orientation of the refueling drone 240 may facilitate coupling of the refueling drone 240 fitting 276 with the receptacle 160 on a receiver aircraft 150. In addition, the drogue 250 may aerodynamically stabilize the refueling drone 240 in the air stream, and maintain a desired catenary in the refueling hose 220.

Step 406 of the method 400 of FIG. 19 may include engaging the refueling drone 240 with a receiver aircraft 150. The method may include pivoting the refueling boom 260 outwardly from the refueling drone 240 as shown in FIGS. 6-7. The method may additionally include telescopically extending a boom section 274 of the refueling boom 260 as shown in FIG. 8. The method may further include manually maneuvering the refueling drone 240 until the fitting 276 engages the receptacle 160 of the receiver aircraft 150. In addition, the method may include deploying one or more control surfaces 280 that may be mounted on the refueling drone 240, and maneuvering the refueling drone 240 in response to manipulating the control surfaces 280. Upon establishing the engagement of the fitting 276 with the receptacle 160 on the receiver aircraft 150, the method may include establishing a communications link between the tanker aircraft 100 and the receiver aircraft 150 using a communications cable 226 that may be extended along the refueling hose 220 and refueling boom 260.

Step 408 of the method 400 of FIG. 19 may include transferring fuel through the refueling hose 220 and refueling drone 240 from the tanker aircraft 100 to the receiver aircraft 150. In an embodiment, the tanker aircraft 100 may include a fuel pump (not shown) for pumping fuel from the tanker aircraft 100 to the receiver aircraft 150. In an embodiment, the fuel pump may be stored within a wing pod 202, a wing 124, a fuselage 108, or generally within the aircraft interior 112. A fuel pump may also be included in the refueling drone 240.

Step 410 of the method 400 of FIG. 19 may include disengaging the fitting 276 from the receptacle 160 such as after completing the transfer of fuel from the tanker aircraft 100 to the receiver aircraft 150. For arrangements were a communications cable 226 is extended along the refueling hose 220, the method may further include breaking the communications link between the tanker aircraft 100 and the receiver aircraft 150 when the refueling boom 260 disengages the receiver aircraft 150.

Step 412 of the method 400 of FIG. 19 may include retracting the refueling hose 220 and the refueling drone 240 into the tanker aircraft 100. For example, the method may include retracting the refueling drone 240 into a wing pod 202. The method may also include retracting the refueling drone 240 into an aircraft body 110 or fuselage 108 or other aircraft interior 112. The method may further include storing the refueling hose 220 in the wing pod 202 and winding the refueling hose 220 on a hose drum. However, as indicated above, the refueling hose 220 may be retracted and stored within a wing 124, a fuselage 108, or other portion of the aircraft interior 112 such as for embodiments where the refueling hose 220 has a relatively large diameter that prevents winding the refueling hose 220 around a hose drum.

Figure 20:
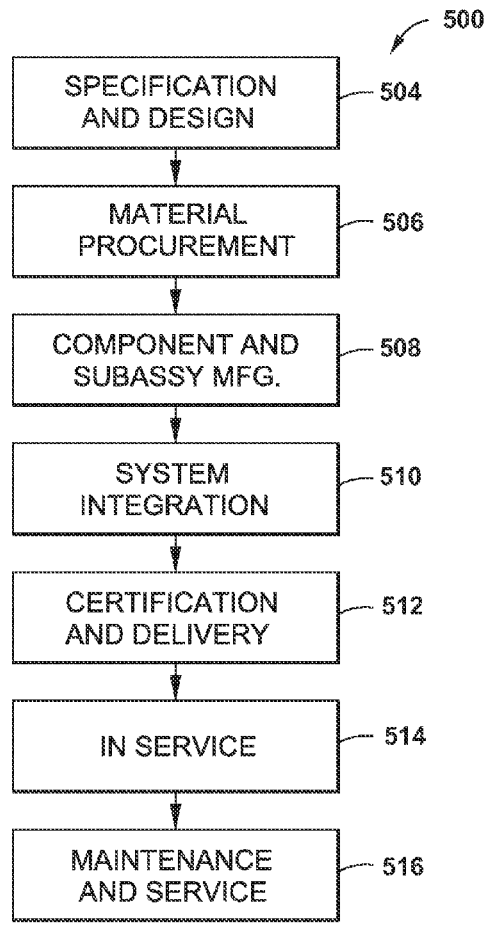
FIG. 20 is a flow diagram of an aircraft manufacturing and service methodology.
Figure 21:
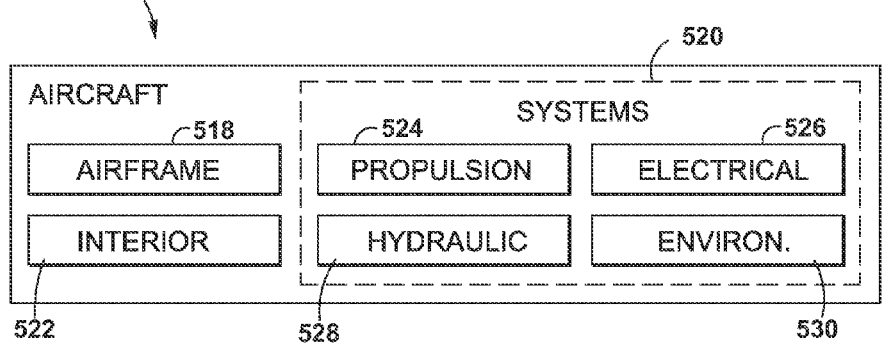
FIG. 21 is a block diagram of an aircraft.

Referring to FIGS. 20-21, embodiments of the disclosure may be described in the context of an aircraft manufacturing and service method 500 as shown in FIG. 20 and an aircraft 502 as shown in FIG. 21. During pre-production, exemplary method 500 may include specification and design 504 of the aircraft 502 and material procurement 506. During production, component and subassembly manufacturing 508 and system integration 510 of the aircraft 502 takes place. Thereafter, the aircraft 502 may go through certification and delivery 512 in order to be placed in service 514. While in service by a customer, the aircraft 502 is scheduled for routine maintenance and service 516 (which may also include modification, reconfiguration, refurbishment, and so on).

Each of the processes of method 500 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 21, the aircraft 502 produced by exemplary method 500 may include an airframe 518 with a plurality of systems 520 and an interior 522. Examples of high-level systems 520 include one or more of a propulsion system 524, an electrical system 526, a hydraulic system 528, and an environmental system 530. Any number of other systems may be included. Although an aerospace example is shown, the principles of the invention may be applied to other industries, such as the automotive industry.

Apparatus and methods embodied herein may be employed during any one or more of the stages of the production and service method 500. For example, components or subassemblies corresponding to production process 508 may be fabricated or manufactured in a manner similar to components or subassemblies produced while the aircraft 502 is in service. Also, one or more apparatus embodiments, method embodiments, or a combination thereof may be utilized during the production stages 508 and 510, for example, by substantially expediting assembly of or reducing the cost of an aircraft 502. Similarly, one or more of apparatus embodiments, method embodiments, or a combination thereof may be utilized while the aircraft 502 is in service, for example and without limitation, to maintenance and service 516.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A refueling system, comprising:
a refueling hose extendable from a tanker aircraft in flight; and
a refueling drone coupled to a hose aft end and being rearwardly deployable from the tanker aircraft such that the refueling drone is towed by the refueling hose behind the tanker aircraft;
the refueling drone having a drone longitudinal axis and including a refueling boom outwardly pivotable from the refueling drone from a retracted position to a deployed position wherein the refueling boom is oriented at a boom pivot angle relative to a drone longitudinal axis, the refueling drone configured to engage a receiver aircraft and transfer fuel from the tanker aircraft to the receiver aircraft.

2. The refueling system of claim 1, wherein the refueling drone includes:
the refueling boom having a fitting configured to mate with a receptacle of the receiver aircraft.

3. The refueling system of claim 1, wherein:
the refueling boom includes a boom section that is telescopically extendable.

4. The refueling system of claim 1, further comprising:
a wing pod mountable to a wing of the tanker aircraft; and
the refueling drone being extendable out of the wing pod and retractable into the wing pod.

5. The refueling system of claim 4, wherein:
the wing pod is configured to contain the refueling hose when the refueling drone is in a retracted position.

6. The refueling system of claim 1, wherein:
the refueling drone is deployable from an aircraft interior of the tanker aircraft.

7. The refueling system of claim 1, further including:
a drogue mounted on a drone aft end of the refueling drone.

8. The refueling system of claim 1, further comprising:
at least one control surface mounted on the refueling drone;
the control surface being outwardly pivotable into an air stream.

9. The refueling system of claim 8, wherein:
an orientation of the control surface is controllable in a manner providing control of at least one of roll, pitch, and yaw of the refueling drone.

10. The refueling system of claim 8, wherein:
a plurality of control surfaces are positioned on the refueling drone;
the control surfaces being independently controllable for attitude control of the refueling drone.

11. An aerial refueling system, comprising:
a refueling hose being extendable from a wing pod mounted to a wing of a tanker aircraft;
a refueling drone having a drone longitudinal axis and coupled to the refueling hose and being rearwardly deployable from the wing pod such that the refueling drone is towed by the refueling hose behind the tanker aircraft;
a refueling boom being pivotable outwardly from the refueling drone from a retracted position to a deployed position wherein the refueling boom is oriented at a boom pivot angle relative to a drone longitudinal axis, the refueling drone configured to mate with a receptacle of a receiver aircraft; and
a plurality of control surfaces positioned on the refueling drone and being controllable for attitude control of the refueling drone.

12. A method of refueling an aircraft, comprising the steps of:
extending a refueling hose from a tanker aircraft;
towing a refueling drone coupled to an end of the refueling hose and having a drone longitudinal axis;
pivoting a refueling boom outwardly from the refueling drone from a retracted position to a deployed position wherein the refueling boom is oriented at a boom pivot angle relative to a drone longitudinal axis;
engaging the refueling drone with a receiver aircraft; and
transferring fuel from the tanker aircraft to the receiver aircraft.

13. The method of claim 12, further comprising:
mating a fitting on the refueling boom with a receptacle of the receiver aircraft.

14. The method of claim 12, further comprising:
telescopically extending a boom section of the refueling boom.

15. The method of claim 12, further comprising:
retracting and extending the refueling drone into and out of a wing pod.

16. The method of claim 15, further comprising:
storing the refueling hose in the wing pod.

17. The method of claim 12, further comprising:
deploying a drogue from a drone aft end of the refueling drone;
generating aerodynamic drag using the drogue.

18. The method of claim 12, further comprising:
retracting and extending the refueling drone into and out of an interior of the tanker aircraft.

19. The method of claim 12, wherein:
deploying a control surface mounted on the refueling drone;
maneuvering the refueling drone in response to deploying the control surface.

20. The method of claim 19, wherein the step of maneuvering the refueling drone comprises:
controlling any combination of roll, pitch, and yaw of the refueling drone.

* * * * *